(12) United States Patent
Pritchard et al.

(10) Patent No.: US 12,026,531 B2
(45) Date of Patent: Jul. 2, 2024

(54) METHODS AND SYSTEMS FOR EMULATING APPLICATION-SPECIFIC WORKSTATIONS ON PERSONAL COMPUTERS

(71) Applicant: Brian Pritchard, King City (CA)

(72) Inventors: Brian Pritchard, King City (CA); Guanghua Lu, Oakville (CA); Matthew Meek, Arroyo Grande, CA (US); Wojciech Marks, Toronto (CA)

( * ) Notice: Subject to any disclaimer, the term of this patent is extended or adjusted under 35 U.S.C. 154(b) by 0 days.

(21) Appl. No.: 17/957,160

(22) Filed: Sep. 30, 2022

(65) Prior Publication Data

US 2023/0103860 A1   Apr. 6, 2023

Related U.S. Application Data

(60) Provisional application No. 63/251,330, filed on Oct. 1, 2021.

(51) Int. Cl.
| | |
|---|---|
| *G06F 9/455* | (2018.01) |
| *G06F 9/4401* | (2018.01) |
| *G06F 21/53* | (2013.01) |
| *G06F 21/57* | (2013.01) |
| *G06F 21/74* | (2013.01) |

(52) U.S. Cl.
CPC ........ *G06F 9/45504* (2013.01); *G06F 9/4401* (2013.01); *G06F 9/4406* (2013.01); *G06F 21/53* (2013.01); *G06F 21/575* (2013.01); *G06F 21/74* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,334,149 | B1* | 12/2001 | Davis, Jr. | G06F 9/4416 |
| | | | | 709/219 |
| 6,463,530 | B1* | 10/2002 | Sposato | G06F 9/4416 |
| | | | | 713/1 |
| 6,732,067 | B1* | 5/2004 | Powderly | G06F 13/105 |
| | | | | 715/740 |
| 9,183,415 | B2 | 11/2015 | Adam et al. | |
| 10,417,428 | B2 | 9/2019 | Rajcan et al. | |
| 2001/0018721 | A1* | 8/2001 | McKenna | G06F 13/409 |
| | | | | 710/305 |
| 2005/0240712 | A1* | 10/2005 | Klein | G06F 13/12 |
| | | | | 710/313 |
| 2008/0256536 | A1 | 10/2008 | Zhao et al. | |

(Continued)

OTHER PUBLICATIONS

Ensurity, "ThinC-Auth." Ensurity.com, publication date unknown, Retrieved from the Internet on Nov. 2, 2022 from URL: https://www.ensurity.com/Products/ThinC_AUTH.

(Continued)

*Primary Examiner* — Abu Zar Ghaffari
(74) *Attorney, Agent, or Firm* — Perry + Currier Inc.

(57) ABSTRACT

Provided are methods and systems which transform a general purpose computer into a secure and dedicated remote work station by enabling the computer to be booted using an operating system stored on a connected portable storage device and by executing the operating system from volatile memory in a secure and efficient manner.

17 Claims, 2 Drawing Sheets

(56) References Cited

U.S. PATENT DOCUMENTS

| | | | | |
|---|---|---|---|---|
| 2009/0138631 | A1* | 5/2009 | Hung | G06F 13/4291 |
| | | | | 710/48 |
| 2009/0307311 | A1* | 12/2009 | Fusari | H04L 63/0272 |
| | | | | 709/227 |
| 2009/0319782 | A1 | 12/2009 | Lee | |
| 2010/0037296 | A1* | 2/2010 | Silverstone | G06F 9/45558 |
| | | | | 718/1 |
| 2010/0050249 | A1* | 2/2010 | Newman | H04L 63/20 |
| | | | | 726/15 |
| 2014/0189816 | A1* | 7/2014 | Halperin | G06F 9/45558 |
| | | | | 726/4 |
| 2016/0381031 | A1* | 12/2016 | McMichael, IV | H04L 63/102 |
| | | | | 726/6 |
| 2017/0147361 | A1* | 5/2017 | Kirvan | G06F 9/44505 |
| 2018/0024839 | A1* | 1/2018 | Gschwind | G06F 9/4408 |
| | | | | 713/2 |
| 2018/0165101 | A1* | 6/2018 | Bulusu | G06F 11/1438 |
| 2019/0199750 | A1* | 6/2019 | Chen | H04L 41/22 |
| 2021/0152485 | A1* | 5/2021 | Sze | H04L 43/0852 |
| 2021/0248227 | A1* | 8/2021 | Yang | G06F 21/53 |

OTHER PUBLICATIONS

Ensurity, "XSense." Ensurity.com, publication date unknown, Retrieved from the Internet on Nov. 2, 2022 from URL: https://www.ensurity.com/Products/XSense.

Ensurity, "Assured Remote Computing." Ensurity.com, publication date unknown, Retrieved from the Internet on Nov. 2, 2022 from URL: https://www.ensurity.com/Products/ARC.

* cited by examiner

METHODS AND SYSTEMS FOR EMULATING APPLICATION-SPECIFIC WORKSTATIONS ON PERSONAL COMPUTERS

FIELD OF THE INVENTION

The invention generally relates to systems and methods for emulating application-specific workstations on personal computers.

BACKGROUND OF THE INVENTION

Workers working from their own home and outside of the traditional office setting is becoming more common. In such instances, employers are currently are presented with two primary options, both of which present undesirable issues to the employers. In the first option, employers send computer hardware to these remote workers, which is expensive and causes complex logistical issues for purchase and support of such hardware. Alternatively, employers require workers to use their own personal computers which raises many problems including security concerns, support requirements, and performance issues because of other programs or viruses running on the worker's personal computer. The present invention provides systems and methods which solve these problems.

SUMMARY OF THE INVENTION

The present invention includes methods and systems for emulating a secure and dedicated remote workstation by a general purpose computer by booting a workstation operating system in volatile memory of the computer received from a connected portable storage device, while prohibiting access or use of the computer existing operating system residing in its non-volatile memory.

Also provided is a method for emulating a secure remote application-specific workstation on a general purpose computer having volatile and non-volatile memories, and a network interface, the method comprising the steps of: prior to booting up the general purpose computer, receiving at a data port of the general purpose computer a portable data storage device, the portable data storage device having stored therein at least a software code for an operating system for emulating an application-specific workstation; as part of initiating the boot up of the general purpose computer, copying the software code from the portable data storage device to the volatile memory, while not accessing or executing any portion of any software code stored in the non-volatile memory; executing by the general purpose computer, a first portion of the software code copied to the volatile memory to transmit authorization request data to the remote administrative server via the network interface; executing by the general purpose computer, a second portion of the software code copied to the volatile memory to confirm that the general purpose computer is authorized to execute at least a third portion of the software code copied to the volatile memory, wherein executing the second portion of the software code causes the general purpose computer to process received authorization response data from the remote administrative server; upon confirmation of authorization based on the processed received authorization response data, executing by the general purpose computer the third portion of the software code for emulating the application-specific workstation and to prevent read and/or write access of any digital information from and/or to the non-volatile memory and the execution of any portion of an operating system stored in the non-volatile memory; and transmitting to and receiving from the network-connected remote administrative server via the network interface information associated with an operation of at least one specific software application of the application specific workstation.

The methods and systems disclosed herein solve many problems associated with providing computer hardware to workers. For instance, the invention only requires sending the worker an USB drive containing the operating system. In contrast, sending computer hardware to a remote user has a much higher initial cost for purchasing, setting up, and shipping the hardware. In addition, the methods and systems eliminate the continuing costs associated with supporting hardware. Further, having computer hardware returned upon termination of the relationship between the host and user is both expensive and logistically difficult. In contrast, the USB drive is inexpensive and need not be returned.

As provided in methods and systems disclosed herein, the operating system only runs from volatile memory such as RAM and does not make use of the computer's non-volatile memory, such as a hard drive or SSD. As such, no confidential information of the host organization or its customers is ever stored on the computer's hard drive thereby enabling and maintain a secure environment.

The methods and system disclosed herein are effectively leveraging and transforming the user's personal computer into a workstation adapted for the user's needs as an employee/contractor for a given assignment. As such, the methods and systems provide improvements over both conventional virtual desktops and thin clients implementations.

BRIEF DESCRIPTION OF THE DRAWINGS

The drawings described below are for illustrative purposes only and are not intended to limit the scope of the invention.

DETAILED DESCRIPTION OF THE INVENTION

Figure 1:
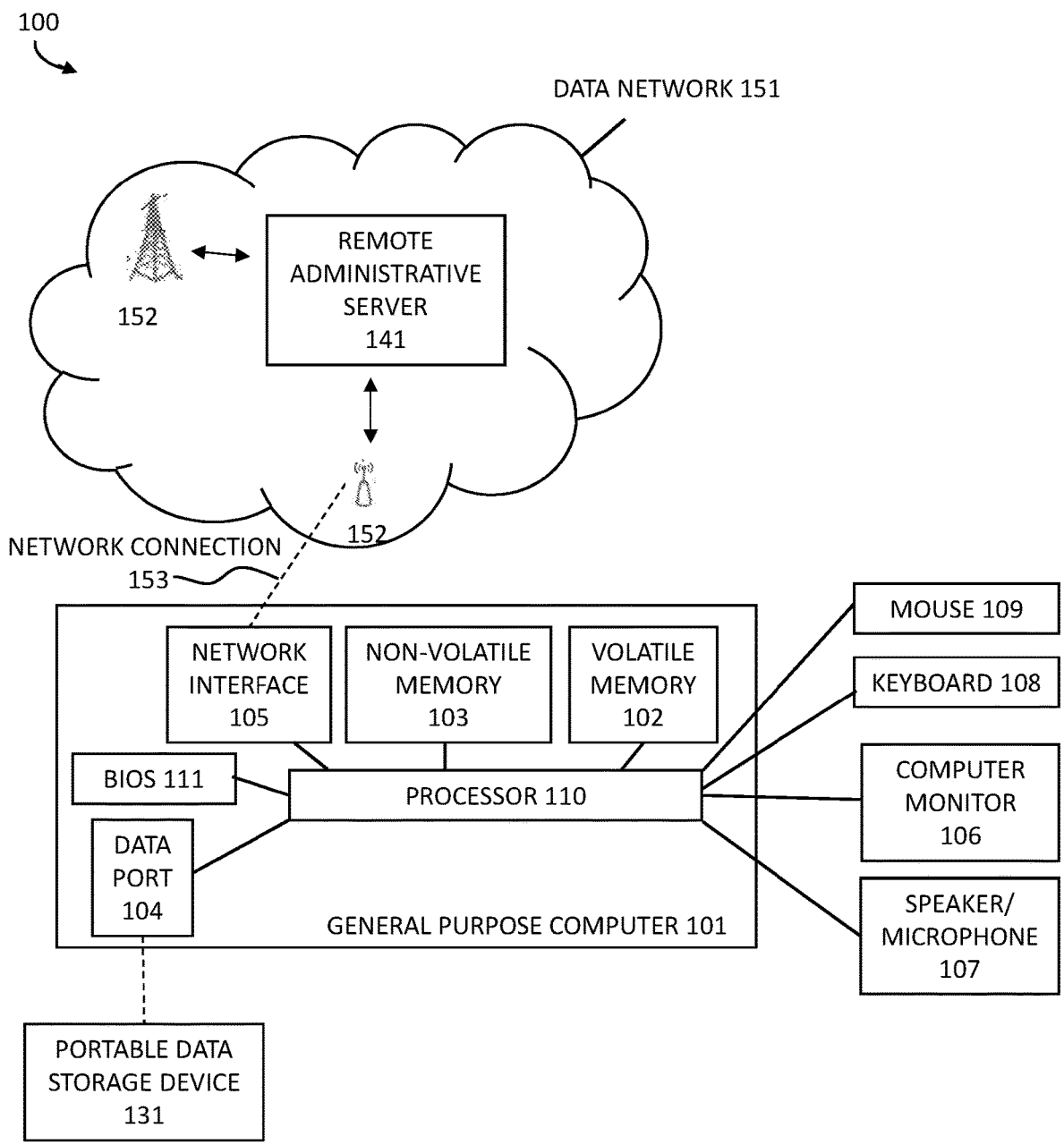
FIG. 1 depicts an illustrative example of components and methods of a system for emulating a secure remote application-specific workstation in accordance with embodiments described herein.

It is to be understood that the terminology employed herein is for the purpose of describing particular embodiments, and is not intended to be limiting. Further, although any methods, devices and materials similar or equivalent to those described herein can be used in the practice or testing of the invention, certain methods, devices and materials are now described.

Throughout this application, articles "a" and "an" are used in this disclosure to refer to one or more than one (i.e., to at least one) of the grammatical object of the article.

As used herein, the term "and/or" includes any and all combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Thus, the methods and systems of the present invention may be performed by a computer based on instructions received by computer software.

The term "device" as used herein is a type of computer generally operated by a person or user of the system. In some embodiments, a device is a computer or smartphone configured to receive and transmit data to a server or other electronic device which may be operated locally or in the cloud. Non-limiting examples of devices include: computer servers, computers, personal computers, IoT devices, portable communication devices, such as smartphones, laptops, tablet computers, and communication systems.

As used herein, a computer readable medium may take many forms, including but not limited to, non-volatile memory and volatile memory. "Non-volatile memory," i.e., memory that maintains stored information therein upon the loss of power, includes, for example, optical, magnetic disks, and magneto-optical disks, such as the hard disk, solid-state drives ("SSDs") or the removable media drive. Conversely, "volatile memory," i.e., memory that loses stored information therein upon the loss of power, includes dynamic memory, such as random access memory ("RAM").

As used herein the term "data network" or "network" shall mean an infrastructure capable of connecting two or more computers such as client devices either using wires or wirelessly allowing them to transmit and receive data. Non-limiting examples of data networks may include the Internet or wireless networks or which may include Wi-Fi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The disclosure is further illustrated by the following descriptions, which are not to be construed as limiting this disclosure in scope or spirit to the specific procedures herein described. It is to be understood that the descriptions are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

New systems and methods for emulating a secure remote application-specific workstation are discussed herein. In the following description, for purposes of explanation, numerous specific details are set forth in order to provide a thorough understanding of the present invention. It will be evident, however, to one skilled in the art that the present invention may be practiced without these specific details.

The present invention will now be described by example and through referencing the appended figures representing preferred and alternative embodiments. FIG. 1 depicts a block diagram of an exemplary system 100 in which a general purpose computer 101 may emulate a secure remote application-specific workstation ("the system") according to embodiments described herein and communicate with a remote administrative server 141 over a data network 151 through a network connection 153 and one or more access points 152.

General purpose computer 101 may generally be a personal computer, laptop computer, or desktop computer, but may also be a smartphone, tablet, netbook, electronic reader, personal digital assistant, large display device, and/or other type of electronic or communication device. General purpose computer 101 may include, for example, a processor 110, a Basic Input/Output System ("BIOS") 111, a volatile memory 102, non-volatile memory 103, data port 104, network interface 105 and/or computer monitor 106. The volatile memory may be RAM.

Conventional BIOS are suitable for use as the BIOS 111, and include a stand-alone non-volatile memory, such as an erasable programmable read-only memory ("EPROM"), containing a computer program executed by the processor 110 to perform start-up procedures upon power up of the computer 101. The data port 104 may be any connection port that allows data connection with a portable storage device, and may be, for example, for connection with conventional Universal Serial Bus ("USB") connectors including without limitation USB-A, USB-B and USB-C type connectors, Lightning connectors, or optical connectors. The data port 104 may also be any circuitry that enables wireless data connection with a portable storage device including, for example, Bluetooth compatible circuitry. The network interface 105 may be a wired or wireless interface.

The computer 101 is also depicted as communicatively-coupled to a computer monitor 106, speaker and microphone 107, keyboard 108, and mouse 109, for receiving and communicating with a user.

Generally as used herein, a user of the computer 101 is an individual who, may be, for example, a remote agent, such as a call attendant. The user may also be an employee or independent contractor. The user may be hired to handle service communications, for example, a communication from a customer regarding an order, request, question or complaint. The client, or client user, may be a person, an organization or an entity and may contract directly or indirectly with user to engage in service communications with customers of the client.

The remote administrative server 141 may be managed by an administrator who may be the client, a third party acting for the benefit of the client, a third party acting under the direction of the client or a service provided whose services the client uses. The customer of the client may be an individual or company who purchased or is considering purchasing a product or service from the client or who otherwise desires to interact with an agent of the client.

Figure 2:
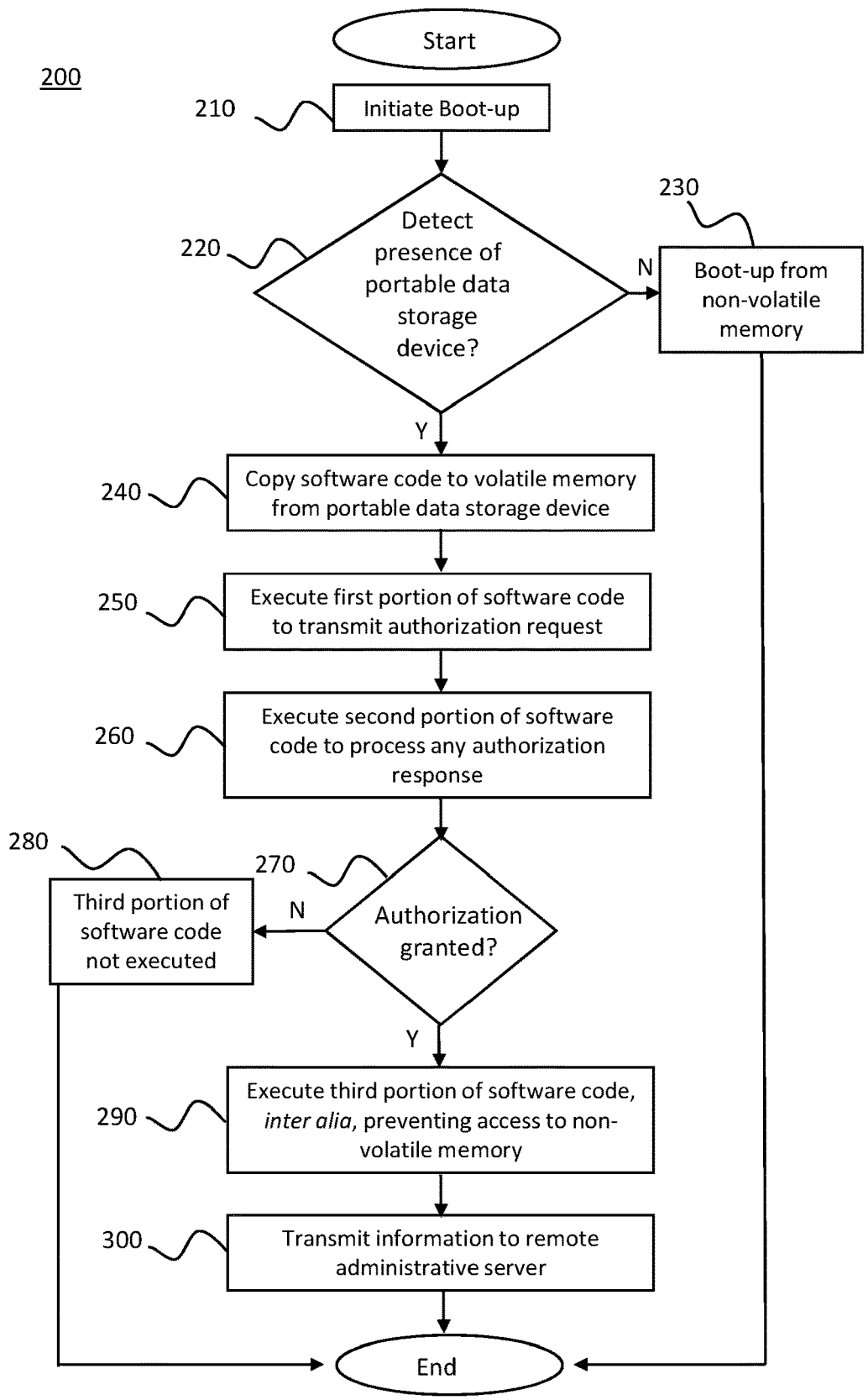
FIG. 2 illustrates a flow diagram of an exemplary method for emulating a secure remote application-specific workstation in the system of FIG. 1 in accordance with embodiments described herein.

FIG. 2 depicts a method 200 performed by general purpose computer 101 for emulation of an application-specific workstation according to embodiments described herein. Prior to performing the steps of the method 200, the BIOS 111 settings are first updated such that upon power-up of the computer 101, the processor 110 first determines if a portable data storage device, such as portable data storage device 131, is connected to a data port 104 containing an operating system for boot-up. It is possible for the user to perform updating of the BIOS 111 settings to perform such boot-up operation by downloading and executing a BIOS setting altering program made available by, for example, the remote administrative 141. Alternatively, a user may update the BIOS 111 to these desired setting manually or by executing a BIOS settings altering program contained in a portable data storage device attached to the data port 104, or as an attachment to an electronic mail message received by the user via the computer 101.

In the computer 101 performing the method 200 of FIG. 2, the processor 110 initiates the boot-up sequence in step 210. In step 220, as part of the boot-up sequence the processor 110 detects if the portable data storage device 131 containing the operating systems is connected to the data port 104. If no portable data storage device is detected, of if a portable data storage device is detected that does not contain software code for an operating system, the method 200 proceeds to step 230 and boots up the computer 101 with the native or default operating system stored in the non-volatile data storage 103. However, if in step 202, the portable data storage device 131 containing software code for an operating system is detected as connected to the data port 104, the method 200 proceeds to step 240.

In step 240, processor 110 stores a copy of the software code from portable data storage device 131 in the volatile memory 102. Then in step 250, the processor 110 executes a first portion of the copied software code in the volatile memory 102. When executed, the first portion of software code is executed, it transmits a certain authorization request data to remote administrative server 141 via network interface 105 and network connection 153. The authorization request data may include data indicative of the computer 101 and/or its network address, and/or indicative of the user. This step may further include a step prompting the user to enter user specific information, such as a user identification and password, and/or a dual authentication code transmitted to the user's mobile device and/or a code produced on an electronic fob provided to the user by the remote administrator.

The remote administrative server 141 may process the received authorization request data sent from the computer 101 and process it by, inter alia, comparing it to data contained in a database to determine whether authorization to emulate the application-specific workstation should be granted. If the remote administrative server 141 determines that access should be granted, then then an authorization response is communicated to the computer 101. This authorization response may include information of the grant or denial of authorization, and optionally, at least one of commands, signals or instructions which either permit or forbid certain actions by the computer 101. The grant of the authorization request may be based on recognizing the user or the computer 101, and, optionally whether the user is attempting to application-specific workstation at a time that corresponds to users schedule for providing services via the remote administrative server 141.

Referring again to FIG. 2, in step 260, the processor 110 executes a second portion of the software code stored in the volatile memory 102 to process any received authorization response data signal received from the remote administrative server 141. Then, in step 270, if authorization is not granted, or no authorization response data signal is received, or if the processor 110 detects something improper with the authorization response data signal, the method 200 proceeds to step 280, and no third portion of software code stored in the volatile memory 102 is executed and the method 200 ends. In the alternative, if the processor 110 detects that authorization is granted in the authorization response data signal, the method 200 proceeds to step 290.

In step 290, the processor 110 executes a third portion of the software code stored in the volatile memory 102, resulting in the processor's access and/or execution an operating system for emulating an application specific workstation by the computer 101. Importantly, execution of the third software code and/or operating system disables access by the processor 110 to the non-volatile memory 103 present in the computer 101. In step 300, the computer 101 transmits information to and receiving from the network-connected remote administrative server via the network interface information associated with an operation of at least one specific software application of the application specific workstation. Advantageously, such transmissions of information between the computer 101 and remote administrative server 141 will be encrypted for added security.

Each of the three portions of the software code, independently of each other, may be transferred as part of the initial transfer from portable data storage device 131 to volatile memory 102 or may be transferred separately from the initial transfer.

As a result of this process, the computer 101 emulates an application-specific workstation, whereby the computer 101 becomes a secure and dedicated workstation with specific applications and restrictions necessary for the user to perform tasks such as tasks associated with the user's job. During such operation, the computer 101 may only perform operations allowed by an administrator and only enable access to applications made available by the administrator. For instance, the computer 101 may prevent screen captures or the installation of any external or added hard drives, non-authorized portable data storage devices, or other storage devices.

The emulated application-specific workstation is highly customization by the administrator. The application-specific workstation may be configured to prevent the computer 101 from read and/or write access of any digital information from and/or to the non-volatile memory or from executing any portion of an operating system stored in the non-volatile memory, such as the native operating system of the computer 101. The application specific-workstation is capable of restricting access to the end point(s), e.g., websites, over a wide area network (WAN) or local area network (LAN), thereby limiting websites the user may access, or restricting logging into and/or using the application-specific workstation during times outside of that a user's scheduled shift.

The operating system of the application-specific workstation may comprise drivers which enable and monitor/track activity of a keyboards, mice, display(s) such as computer monitor 106, network interface controllers such as network interface 105, and other devices necessary to enable the user to operate and complete tasks during a set period of time such as a scheduled shift.

The operating system of the application-specific workstation may include ancillary programs needed for productivity such as a word processors, spreadsheet processors, document readers and other work productivity type applications, and virus scanners as needed. Such ancillary programs may be part of the operating system, downloaded from a server such as remote administrative server 141 as needed, at boot-up, or may be executed remotely, such as on the server, and operated as a software-as-a-service (SAAS).

The operating system of the application-specific workstation may be configured to enhance the security of relevant data, such as the host organization's data and/or the data of its customers. For example, the operating system may control and permit usage of a network cards such as network interface 105, keyboards, mice, and/or any other hardware connected to general purpose computer 101, such as a microphone or speaker 107, to function but can prevent or limit the functionality of printing, surfing the web, and copying and pasting data, local saving. Such limitations may differ for different applications, users, or organizations.

Portable data storage device 131 may be any portable storage medium capable of being connected to and read by the computer such as a Universal Serial Bus (USB) data stick or drive, or any other external storage medium. The operating system present on portable data storage device 131 may be encrypted for added security to prevent its use for any other storage medium.

Remote administration server 141 may perform a number of functions including:
  Determine if the latest version of the operating system is being used;
  Determine if ancillary programs are the correct version; and/or
  Make updates or additions to the operating system or ancillary programs available, as needed. Such additions may include installing an ancillary program not previously present. The operating system may use application partitioning so that applications are able to update without interrupting the activities of the user.

For enhanced security, dual factor authentication of the user may be performed using a secure token against a user database.

The operating system of the application-specific workstation may be based on a one or more of well know programming languages including, for example, Linux. The operating system of the application-specific workstation may be a custom operating system.

In one embodiment, a USB drive containing a bootable encrypted operating system is provided to a user.

One application of the present invention is an operating system running a customer call center application for use in virtual or remote call centers and other environments.

The operating system may include a key logger program to monitor the user's activity and productivity, and provide reports to the administrator.

The operating system of the application-specific workstation may support installed Quality of Service ("QoS") applications that continuously monitor packet loss, jitter and latency reporting in real-time to the user and the administration server on the quality of the internet connection to support the transmission of data, voice and video against a minimum standard of quality. As such, the methods and system can determine if the user's computer and internet connection is capable of meeting minimum speed and performance criteria necessary for using the required tools and applications to complete tasks.

The operating system of the application-specific workstation may support an application that reports on the time of network access by the user. This may be used with a predetermined access schedule accessed via remote administration server 141. This can be used to: log the attendance of a user against a predetermined schedule; allow or block access to any network endpoint; prevent the user from accessing the operating system outside of a pre-determined access schedule; or track and report on time-and-attendance against a pre-determined schedule.

The operating system of the application-specific workstation may enable a secure remote workstation to be a PCI certified work station pursuant to the Payment Card Industry Data. Security Standard (PCI DSS), which is a compliance scheme that aims to secure credit and debit card transactions against data theft and fraud. The configuration as a whole enables the device or computer to be a PCI Level 1 certified device as a service on a network.

Provided is a system and method creates a secure and dedicated remote workstation, by enabling a computer, such as a personal computer of a user (e.g. a remote working call attendant), to be booted using an operating system stored on a connected portable storage device, wherein the boot-up process includes transferring the operation system from the connected portable storage device to the volatile memory of the computer, and then executing the operating system by the computer solely from such volatile memory, and to prohibit booting, partially or wholly, of any operating system stored in the computer.

The portable storage medium or portable data storage device may be a USB drive, or any other external storage medium capable of being connected to and read by the computer.

In one embodiment, the operating system included in the portable storage medium is encrypted for added security to prevent its use for any other storage medium.

In some embodiments, the volatile memory in the computer is at least 4 GB.

In a method of the invention, the user's computer recognizes a portable storage medium and then an executable will disable the hard drive and install the custom operating system included on the portable data storage drive to the volatile memory of the computer. Alternatively, if the portable storage medium is not inserted before subsequent boot-up, the user's computer will operate normally, and use the computer's operating system

Advantages of the Invention

As provided in methods and systems disclosed herein, the operating system only runs from volatile memory such as RAM and does not make use of the computer' hard drive. As such, no confidential information of the host organization or its customers is ever stored on the computer's hard drive thereby enabling and maintain a secure environment. The operating system is not reading from or writing anything from the computer's hard drive.

The methods and systems disclosed herein solve many problems associated with providing computer hardware to workers. For instance, the invention only requires sending the worker an USB drive containing the (encrypted) operating system. In contrast, sending computer hardware to a remote user has a much higher initial cost for purchasing, setting up, and shipping the hardware. In addition, the methods and systems eliminate the continuing costs associated with supporting hardware. Further, having computer hardware returned upon termination of the relationship between the host and user is both expensive and logistically difficult. In contrast, the USB drive is inexpensive and need not be returned.

The methods and system disclosed herein are leveraging and transforming the user's personal computer into a workstation adapted for the user's needs as an employee/contractor for a given assignment. As such, the methods and systems provide improvements over both virtual desktops and thin clients.

The disclosed systems and methods are superior to virtual desktops because they eliminate any performance issues that may be present in the operating system and/or hard drive of the user's personal computer. The virtual desktop is typically running in the worker's operating system which may be out of date, slow, have viruses or malware, and/or have insufficient memory to run both the operating system and the virtual desktop simultaneously. Each of these issues may result in the user (e.g. worker) needing technical assistance from the host (e.g. employer) adding additional expense and inefficiencies. Compared to thin clients, the systems and methods have no hardware cost to the host because the user can safely and securely use their own equipment. Additionally, physical space on user's physical desk is saved because there is no need for two computer devices, thereby providing a smaller footprint.

The disclosed systems and methods enable workers to use their own personal computers without the drawbacks of presently used methods. For instance, virtual desktops accessed by workers over a network result in potential security problems. Typically, virtual desktops run in the background of a worker's operating system and thus the hard drive may access confidential or sensitive information.

Further, in virtual desktops, the worker is typically able to minimize the virtual desktop and access their own computer's hard drive and programs, potentially allowing the worker to perform non-work related tasks and harming the worker's productivity, and associated QoS.

The present invention includes a method for emulating a secure remote application-specific workstation on a general purpose computer having volatile and non-volatile memories, and a network interface. One such method includes the steps of: prior to booting up the general purpose computer, receiving at a data port of the general purpose computer a portable data storage device, the portable data storage device having stored therein at least a software code for an operating system for emulating an application-specific workstation; as part of initiating the boot up of the general purpose computer, copying the software code from the portable data storage device to the volatile memory, while not accessing or executing any portion of any software code stored in the non-volatile memory; executing by the general purpose computer, a first portion of the software code copied to the volatile memory to transmit authorization request data to the remote administrative server via the network interface, wherein executing the second portion of the software code causes the general purpose computer to confirm that the general purpose computer is authorized to execute at least a third portion of the software code copied to the volatile memory, wherein executing the second portion of the software code causes the general purpose computer to process received authorization response data from the remote administrative server; upon confirmation of authorization based on the processed received authorization response data, executing by the general purpose computer the third portion of the software code for emulating the application-specific workstation and to prevent read and/or write access of any digital information from and/or to the non-volatile memory and the execution of any portion of an operating system stored in the non-volatile memory; and transmitting to and receiving from the network-connected remote administrative server via the network interface information associated with an operation of at least one specific software application of the application specific workstation.

In one embodiment, at least one of the first, second and third portions of the software code stored in the portable data storage device is encrypted.

In another embodiment, execution of the third portion of the software code comprises receiving at least one of the at least one of specific software application from the remote administrative server.

In an embodiment, at least one other specific software application of the application specific workstation is executed at least in part in the network-connected remote administrative server and accessed by the general purpose computer.

In a further embodiment, the at least one specific application of the application specific workstation is a specific application for a call attendant workstation.

In some embodiments, the copied software code into the volatile memory includes at least one software driver for a network interface controller of the general purpose computer, and wherein the method further comprises controlling with the at least one software driver at least one of a computer monitor, mouse, keyboard, microphone and camera connected to the general purpose computer.

In certain embodiments, the specific software applications of the application specific workstation may include enable customer communications for at least one of customer inquiries, complaints, orders or requests. The specific software applications may also include software applications for at least one of quality of service monitoring, word processors, spreadsheet applications, document reader applications, key-logger, and other productivity applications. Further, the software applications for the quality of service monitoring may include monitoring at least one of packet loss, jitter, latency and other indicators for the quality of the network connection. In some embodiments, the quality of service monitoring is based on monitoring of the at least one of packet loss, jitter, latency and other indicators for the quality of the network connection relative to minimum performance criteria. The specific software application of the application specific workstation may be a specific application for emulating a Payment Card Industry Data Security Standard (PCI DSS), level 1, compliant workstation.

The method may further comprise the step of controlling permitted operations available to a user of the general purpose computer by at least one of executing the second portion of the software code, and instructions received from the network-connected remote administrative server via the network interface. In some embodiments, the permitted operations excludes at least one of printing, accessing the internet, cutting, pasting or copying data, and using any data ports of the general purpose computer.

The permitted operations may be based on at least predetermined responsibilities of the user of the general purpose computer and time periods when the user is scheduled to access such permitted operations. Further, the received authorization response data from the remote administrative server may be based on a dual authentication process.

In some embodiments, at least one of the first, second or third portions of the software code is based on the Linux operating system.

In some embodiments, execution of the third portion of the software code executes application partitioning for updating software applications for execution in the general purpose computer without interfering with the activities of the user of such general purpose computer.

The secure remote application-specific workstation may be used in connection with a computer program which consists of an operating platform. The operating platform includes a proprietary operating system for creating a channel to the client user systems to obtain customer data and to a telephony server for linking with a client user call queue.

The secure remote application-specific workstation may provide a customized desktop usable by remote agents which includes a series of support and self-management tools. These tools may be based on well-known utilities. The secure remote application-specific workstation may provide access to a series of known collaboration utilities that enable the client users (for example a manager) to collaborate with remote agents, and also for remote agents to collaborate with other remote agents in execution of tasks for their client users, One such collaboration tool may be an online calendar interface enabling remote agents to schedule their shifts for particular client users, and client users to control remote agent requirements, as well as client user personnel and remote agents to collaborate regarding their scheduling activities.

The secure remote application-specific workstation may provide communications tools chat workrooms which automatically launch after login to provide door for easy collaboration between client user managers and their remote agents. Other features may include web mail, group announcements, online discussions, mailbox, wireless access, and other similar utilities.

The secure remote application-specific workstation may provide productivity tools for deployment by operation of the Real-Time Work Centers, including Task Managers, Group Links, and Extranet Options or administrative and security tools which includes for various means for ensuring the security of client user data including secure member access, permissions system, member groups, secure hosting, and 5SL encryption.

It is to be understood that the invention is not limited to the particular embodiments of the invention described above, as variations of the particular embodiments may be made and still fall within the scope of the appended claims.

REFERENCE SIGNS 101 general purpose computer
102 volatile memory
103 non-volatile memory
104 data port
105 network interface
106 computer monitor
107 speaker/microphone
108 keyboard
110 processor
111 BIOS
131 portable data storage device
141 remote administrative server
151 data network
152 access points
153 network connection

The invention claimed is:

1. A method for emulating a secure remote application-specific workstation on a general purpose computer having volatile and non-volatile memories, and a network interface, the method comprising:
   prior to booting up the general purpose computer, receiving at a data port of the general purpose computer a portable data storage device, the portable data storage device having stored therein at least a software code for an operating system for emulating an application-specific workstation;
   modifying a Basic Input/Output System (BIOS) setting of the general purpose computer such that the general purpose computer will first determine whether the software code for emulating the application-specific workstation operating system is accessible from the portable data storage device connected to the data port prior to attempting to execute any portion of the operating system stored in the non-volatile memory of the general purpose computer;
   as part of initiating the boot up of the general purpose computer, copying the software code from the portable data storage device to the volatile memory, while not accessing or executing any portion of any software code stored in the nonvolatile memory;
   executing by the general purpose computer, a first portion of the software code copied to the volatile memory to transmit authorization request data to the remote administrative server via the network interface;
   executing by the general purpose computer, a second portion of the software code copied to the volatile memory to confirm that the general purpose computer is authorized to execute at least a third portion of the software code copied to the volatile memory, wherein executing the second portion of the software code causes the general purpose computer to process received authorization response data from the remote administrative server;
   upon confirmation of authorization based on the processed received authorization response data, executing by the general purpose computer the third portion of the software code for emulating the application-specific workstation and to prevent read and/or write access of any digital information from and/or to the non-volatile memory and the execution of any portion of the operating system stored in the nonvolatile memory; and
   transmitting to and receiving from the network-connected remote administrative server via the network interface information associated with an operation of at least one specific software application of the application specific workstation, wherein the at least one specific software application of the application specific workstation is a specific application configured for compliance with a Payment Card Industry Data Security Standard (PCI DSS), level 1 system.

2. The method of claim 1 wherein at least one of the first, the second and the third portions of the software code stored in the portable data storage device is encrypted.

3. The method of claim 1 wherein execution of the third portion of the software code comprises receiving at least one of the at least one of specific software application from the remote administrative server.

4. The method of claim 1 wherein at least one other specific software application of the application specific workstation is executed at least in part in the network-connected remote administrative server and accessed by the general purpose computer.

5. The method of claim 1 wherein the at least one specific application of the application specific workstation is a specific application for a call attendant workstation operable by a call attendant who performs customer service.

6. The method of claim 5 wherein the copied software code into the volatile memory includes at least one software driver for the general purpose computer, and wherein the method further comprises controlling with the at least one software driver at least one of a network interface controller, computer monitor, mouse, keyboard, microphone and camera connected to the general purpose computer.

7. The method of claim 5 wherein the specific software application of the application specific workstation includes customer communications for at least one of customer inquiries, complaints, orders or requests.

8. The method of claim 1 wherein the at least one specific software application includes software applications for at least one of quality of service monitoring, word processors, spreadsheet applications, document reader applications, key-logger, and productivity applications.

9. The method of claim 8 wherein the software applications for the quality of service monitoring includes monitoring at least one of packet loss, jitter, latency and indicators for the quality of the network connection.

10. The method of claim 9 wherein the quality of service monitoring is based on monitoring of the at least one of packet loss, jitter, latency and indicators for the quality of the network connection.

11. The method of claim 1 further comprising downloading and executing BIOS setting altering software received via the network interface prior to performing the receiving.

12. The method of claim 1 further comprising controlling permitted operations available to a user of the general purpose computer by at least one of executing the second portion of the software code, and instructions received from the network connected remote administrative server via the network interface.

13. The method of claim 12 wherein the permitted operations excludes at least one of printing, accessing the internet, cutting, pasting or copying data, and using any data ports of the general purpose computer.

14. The method of claim 12 wherein the permitted operations are based on at least predetermined responsibilities of the user of the general purpose computer and time periods when the user is scheduled to access such permitted operations.

15. The method of claim 1 wherein the received authorization response data from the remote administrative server is based on a dual authentication process.

16. The method of claim 1 wherein at least one of the first, the second or the third portions of the software code is based on a Linux operating system.

17. The method of claim 1 wherein execution of the third portion of the software code executes application partitioning for updating software applications for execution in the general purpose computer without interfering with the activities of the user of the general purpose computer.

\* \* \* \* \*